US009527530B2

(12) United States Patent
Kawaguchi

(10) Patent No.: US 9,527,530 B2
(45) Date of Patent: Dec. 27, 2016

(54) VEHICLE BODY STRUCTURE

(71) Applicant: MITSUBISHI JIDOSHA KOGYO KABUSHIKI KAISHA, Tokyo (JP)

(72) Inventor: Taichi Kawaguchi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/067,697

(22) Filed: Mar. 11, 2016

(65) Prior Publication Data

US 2016/0264177 A1    Sep. 15, 2016

(30) Foreign Application Priority Data

Mar. 12, 2015 (JP) ................................. 2015-049768

(51) Int. Cl.
| B62D 21/08 | (2006.01) |
| B62D 21/15 | (2006.01) |
| B62D 25/20 | (2006.01) |

(52) U.S. Cl.
CPC ............. B62D 21/15 (2013.01); B62D 21/08 (2013.01); B62D 25/20 (2013.01)

(58) Field of Classification Search
CPC ..... B62D 25/20; B62D 25/2036; B62D 21/15; B62D 21/157; B62D 21/08; B62D 21/03
USPC ............... 296/187.08, 204, 193.07
See application file for complete search history.

(56) References Cited

U.S. PATENT DOCUMENTS

| 6,854,791 | B1 * | 2/2005 | Jaggi | ..................... | B62D 29/041 |
| | | | | | 296/203.01 |
| 8,585,133 | B2 * | 11/2013 | Yasuhara | ............... | B62D 21/11 |
| | | | | | 296/187.09 |
| 9,096,269 | B2 * | 8/2015 | Kimoto | ................. | B62D 29/046 |
| 2003/0137163 | A1 * | 7/2003 | Hayashi | ............... | B62D 21/152 |
| | | | | | 296/204 |
| 2004/0108754 | A1 * | 6/2004 | Igarashi | ............... | B62D 27/023 |
| | | | | | 296/204 |

(Continued)

FOREIGN PATENT DOCUMENTS

JP    2007-118736 A    5/2007

*Primary Examiner* — Gregory Blankenship
(74) *Attorney, Agent, or Firm* — Birch, Stewart, Kolasch & Birch, LLP

(57) ABSTRACT

The present invention is a vehicle body structure, including: a pair of side members disposed under a vehicle cabin where front seats and a rear seat are disposed on both sides in a vehicle width direction and extending along a vehicle front-rear direction; a front seat cross member provided so as to extend along the vehicle width direction on a lower side of the front seats and coupling together the side members; a rear seat cross member provided so as to extend along the vehicle width direction on a lower side of the rear seat and coupling together the side members on a rear side of the front seat cross member; and coupling members provided so as to extend along the vehicle front-rear direction further on an inner side in the vehicle width direction than the side members and coupling together the front seat cross member and the rear seat cross member, wherein the front seat cross member and the rear seat cross member have a branch structure, with portions thereof on both end sides in the vehicle width direction each forked into a front-side branch and a rear-side branch in the vehicle front-rear direction.

8 Claims, 5 Drawing Sheets

(56) References Cited

U.S. PATENT DOCUMENTS

| | | | | |
|---|---|---|---|---|
| 2007/0257519 | A1* | 11/2007 | Hanson, Jr. | B62D 21/157 296/204 |
| 2008/0007089 | A1* | 1/2008 | Bachmann | B62D 21/157 296/187.08 |
| 2010/0078968 | A1* | 4/2010 | Boettcher | B62D 33/023 296/193.07 |
| 2010/0187864 | A1* | 7/2010 | Tsuchida | B62D 25/20 296/193.07 |
| 2011/0241381 | A1* | 10/2011 | Sato | B62D 25/20 296/193.02 |
| 2013/0257097 | A1* | 10/2013 | Kojo | B62D 25/2036 296/187.08 |
| 2014/0117716 | A1* | 5/2014 | Patberg | B62D 21/157 296/187.08 |
| 2014/0327268 | A1* | 11/2014 | Mori | B62D 21/157 296/187.08 |
| 2014/0338996 | A1* | 11/2014 | Baccouche | B62D 21/157 180/68.5 |
| 2015/0008703 | A1* | 1/2015 | Furusaki | B62D 21/152 296/187.08 |
| 2015/0251700 | A1* | 9/2015 | Choi | B62D 25/20 296/204 |
| 2016/0052561 | A1* | 2/2016 | Atsumi | B62D 25/2018 296/187.08 |

\* cited by examiner

VEHICLE BODY STRUCTURE

BACKGROUND OF THE INVENTION

Field of the Invention

The present invention relates to a vehicle body structure, especially relates to a vehicle lower body frame structure which supports a lower part of a vehicle cabin.

Description of the Related Art

A vehicle has a lower part of the vehicle cabin, where occupants are present, supported by a vehicle lower body frame structure.

The vehicle cabin of most vehicles has a backbone at the center in the vehicle width direction, and front seats are disposed in a lower part on both sides in the vehicle width direction across the backbone. Rear seats are disposed in a lower part of the vehicle cabin, on the rear side of the front seats. Therefore, the vehicle lower body frame structure employs a lattice-shaped structure, as disclosed in Japanese Patent Laid-Open No. 2007-118736, which has a pair of side members disposed under the vehicle cabin on both sides in the vehicle width direction and extending along the vehicle front-rear direction, a front seat cross member disposed between these side members and passed under the front seats to couple together the side members, and a rear seat cross member passed under the rear seats to couple together the side members.

To secure the crash safety, the vehicle cabin where occupants are present is required to have the rigidity and strength to withstand impact load.

However, in the event of a frontal offset crash, i.e., a frontal crash in which impact load is applied intensively to one side of the vehicle front, the vehicle lower body frame structure of a simple lattice shape as described above cannot easily disperse the impact load to the front seat cross member and the rear seat cross member. As a result, the impact load is likely to be input intensively to only the side member on that one side. Accordingly, the side member on the crash side is likely to move toward the vehicle rear side, which may result in distortion of the vehicle lower body frame structure and deformation of the vehicle cabin.

In the case of a side crash of a vehicle, especially a pole crash, i.e., a crash in which a vehicle crashes into a pole and impact load is applied locally to the vehicle side, as the impact load is applied intensively to one part of the vehicle side, the front cross member and the rear cross member disposed under the front seats and the rear seats fail to support the load, so that only the vehicle side to which the impact load is applied deforms significantly toward the vehicle inner side. This may result in distortion of the vehicle lower body frame structure and deformation of the vehicle cabin.

Moreover, when impact is applied to the seatbelt of the front seat or the rear seat in a frontal crash of a vehicle, the lattice-shaped vehicle lower body frame structure causes the impact load to be applied intensively to only the front seat cross member or the rear seat cross member through the seatbelt anchor. Accordingly, an excessive bending stress is exerted on the front seat cross member, which may result in deformation of the front seat cross member.

To suppress deformation of the vehicle cabin due to deformation of the side members or the cross members, reinforcement measures, such as increasing the thickness or the cross-sectional area of the side members and the cross members or providing a reinforcing member, have been conventionally taken.

However, impact load tends to become excessive. Therefore, the measure of simply reinforcing the individual members cannot sufficiently cope with such impact load and can hardly suppress deformation of the vehicle cabin.

SUMMARY OF THE INVENTION

An object of the present invention is to provide a vehicle body structure which can suppress deformation of a vehicle cabin, where occupants are present, by efficiently dispersing impact load toward a non-crash side.

The present invention is a vehicle body structure, including: a pair of side members disposed under a vehicle cabin where a front seat and a rear seat are disposed on both sides in a vehicle width direction and extending along a vehicle front-rear direction; a front seat cross member provided so as to extend along the vehicle width direction on a lower side of the front seat and coupling together the side members; a rear seat cross member provided so as to extend along the vehicle width direction on a lower side of the rear seat and coupling together the side members on a rear side of the front seat cross member; and coupling members provided so as to extend along the vehicle front-rear direction further on an inner side in the vehicle width direction than the side members and coupling together the front seat cross member and the rear seat cross member, wherein the front seat cross member and the rear seat cross member have a branch structure, with portions thereof on both end sides in the vehicle width direction each forked into a front-side branch and a rear-side branch in the vehicle front-rear direction.

According to the present invention, it is possible to transfer impact load in a frontal offset crash or a side pole crash to the side member on a non-crash side while efficiently dispersing the impact load from the side member on the crash side, to which the impact load is applied, to the front seat cross member and the rear seat cross member. It is also possible to secure the rigidity by establishing a truss structure, composed of the branch structures, under areas around the front seat and the rear seat.

Thus, the vehicle body structure of the present invention can sufficiently and effectively suppress deformation of the vehicle cabin, where occupants are present, by efficiently dispersing impact load toward a non-crash side.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

In the following, the present invention will be described on the basis of one embodiment shown in FIG. 1 to FIG. 7.

Figure 1:
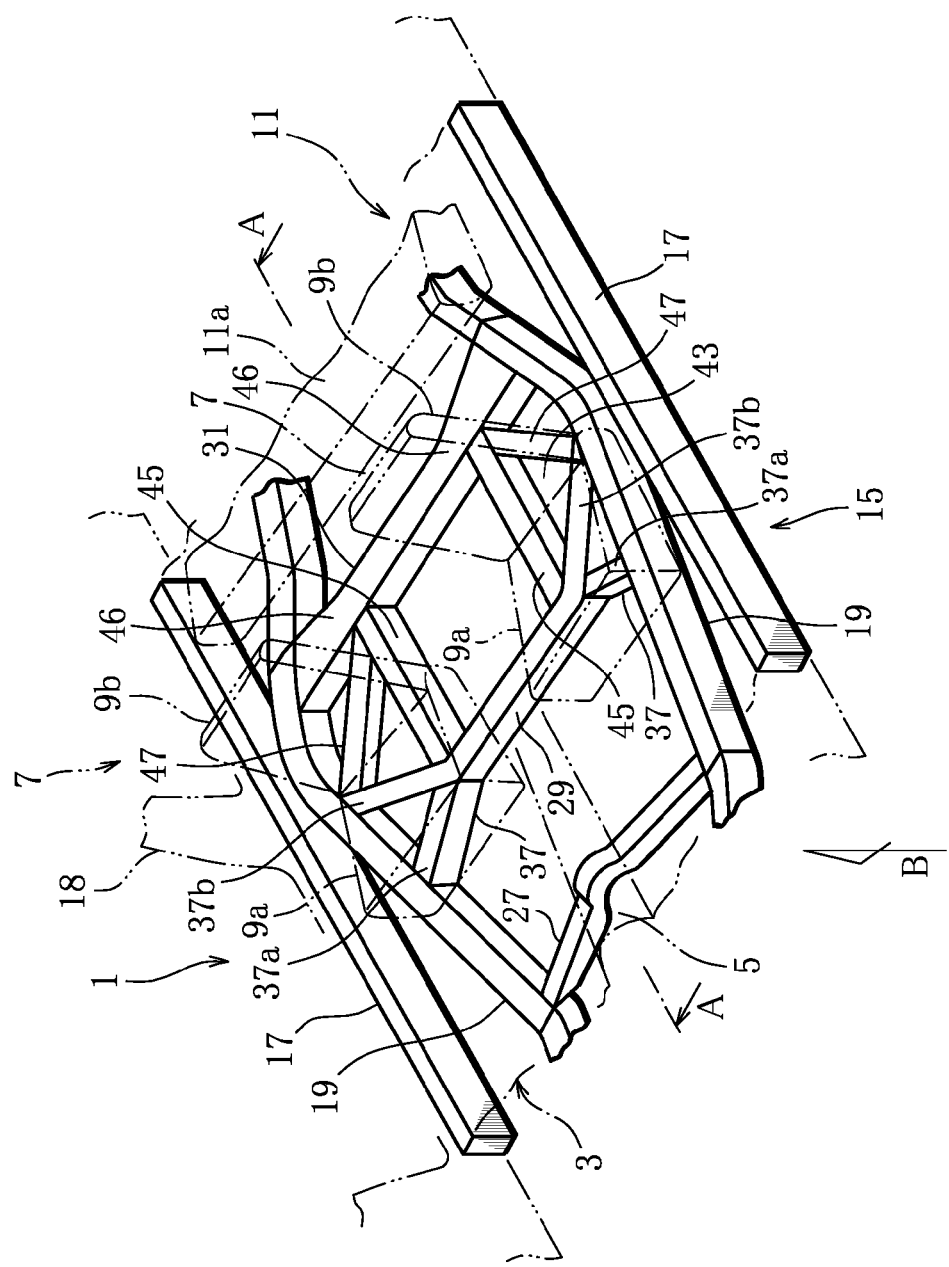
FIG. 1 is a perspective view showing a vehicle lower body frame structure according to one embodiment of the present invention.
Figure 2:
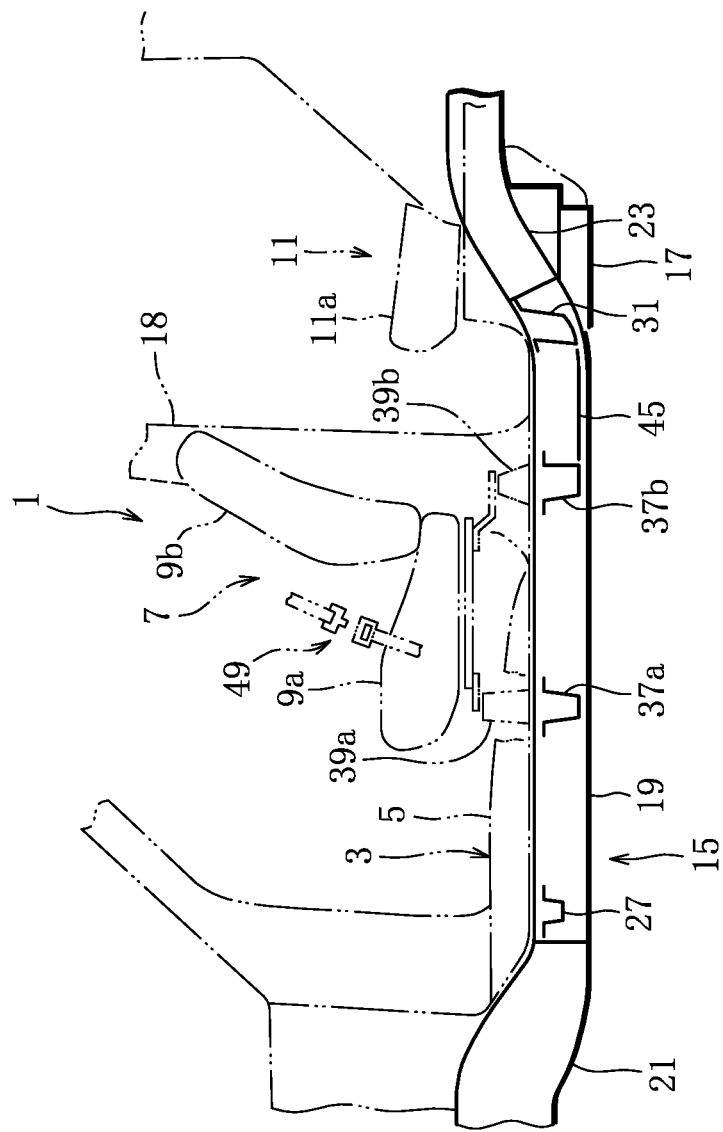
FIG. 2 is a cross-sectional view along the line A-A of FIG. 1.

FIG. 1 shows a vehicle lower body frame structure of the present invention; FIG. 2 is a cross-sectional view of a vehicle cabin, including the vehicle lower body frame structure, along the line A-A of FIG. 1; and FIG. 3 is a bottom view of the vehicle lower body frame structure as seen from the direction of the arrow B of FIG. 1.

Figure 3:
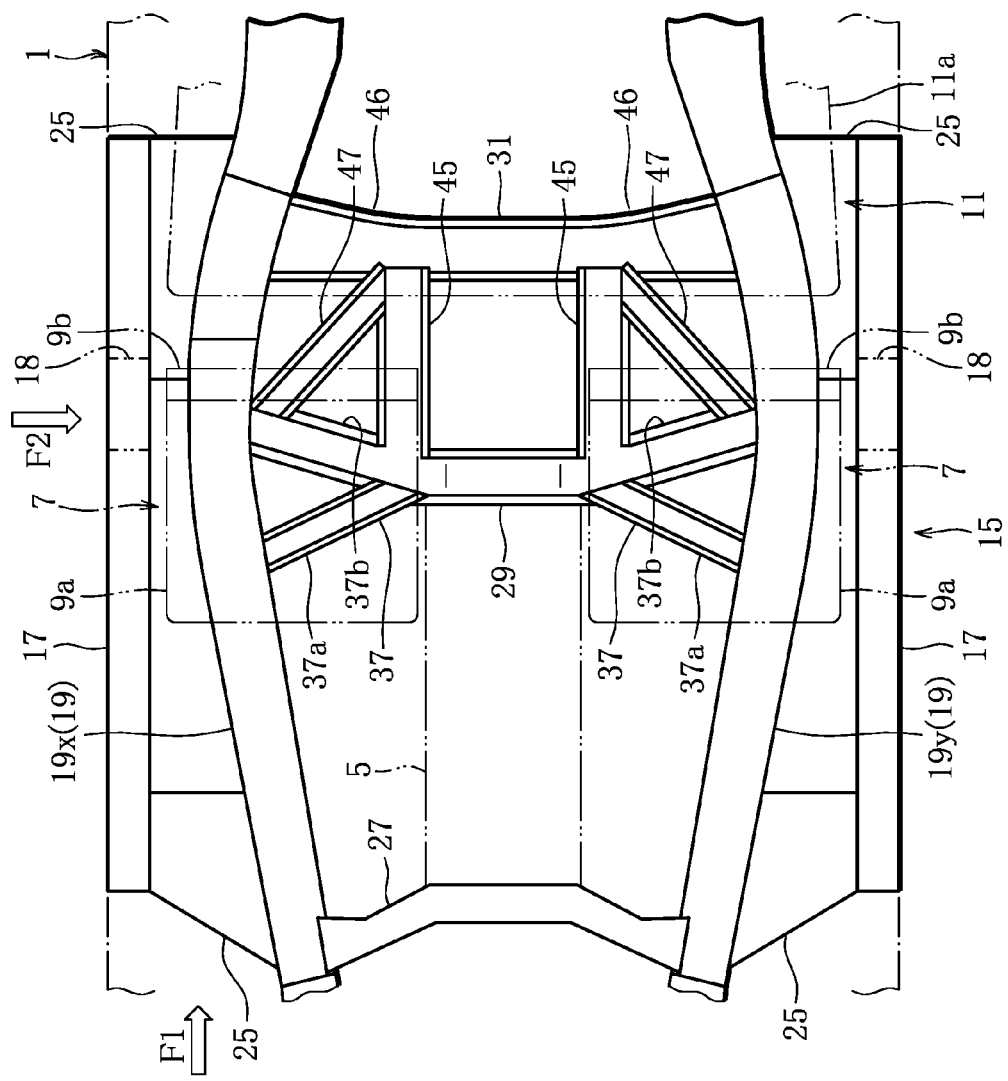
FIG. 3 is a bottom view from the direction of the arrow B of FIG. 1.

As shown in FIG. 1 to FIG. 3, a lower frame 15, which is the vehicle lower body frame structure, is formed under a vehicle cabin 1 which is a residential space of occupants in a vehicle. The lower frame 15 supports a lower part of the vehicle cabin 1.

As indicated by the two-dot chain lines in FIG. 1 to FIG. 3, the vehicle cabin 1 has a floor 3 in a lower part, and has a backbone 5, which is formed, for example, by a floor tunnel, at the center in the vehicle width direction of the floor 3. A pair of front seats 7 composed of seat cushions 9a and seat backs 9b are disposed on the front side of the floor, on both sides across the backbone 5 which extends in the vehicle front-rear direction. On the rear side of the front seats 7, a bench seat-type rear seat 11 is disposed so as to straddle the backbone 5. A part of a seat cushion 11a of the rear seat 11 is shown in FIG. 1 to FIG. 3.

As shown in FIG. 1 to FIG. 3, the lower frame 15 has a pair of left and right side sills 17 disposed on both outermost sides in the vehicle width direction of the vehicle cabin 1, and a pair of left and right side members 19 disposed on the inner side of the side sills 17. The pair of side sills 17 and the pair of side members 19 are both formed by members with a closed cross-section which extend along the vehicle front-rear direction. Of these members, the side members 19 extend from the front side to the rear side of the vehicle body, obliquely toward the outer side of the vehicle cabin 1. As indicated by the two-dot chain lines in FIG. 1 to FIG. 3, the side members 19 are formed such that the extension side thereof comes closest to the side sill 17 at the position of a center pillar 18, which is disposed on the side sill 17 between the front seat 7 and the rear seat 11, and then extends obliquely inward. As shown in FIG. 3, the side members 19 are formed so as to pass on the lower side of the front seats 7 and the rear seat 11. As shown in FIG. 2, front portions of the pair of side members 19 extend through a kick-up part 21 to the vehicle front. As shown in FIG. 2, rear portions of the side members 19 extend through a kick-up part 23 to the vehicle rear. As shown in FIG. 3, portions of the pair of side sills 17, for example, the front and rear ends thereof, are respectively connected to the side members 19 through gussets 25.

As shown in FIG. 1 to FIG. 3, the lower frame 15 has a plurality of cross members coupling together the pair of side members 19. All the cross members are provided so as to extend in the vehicle width direction between the pair of side members 19. That is, a front cross member 27 is provided between the side members 19 at a position where a dashboard panel (not shown) which divides the front side of the vehicle cabin 1 is disposed, and a front seat cross member 29 is provided at a position where the seat cushions 9a of the front seats 7 are disposed. A rear seat cross member 31 is provided at a position where the seat cushion 11a of the rear seat 11 is provided. In this vehicle lower body frame structure, the lower frame 15 is designed so as to withstand impact load in a frontal offset crash, i.e., a crash in which impact load is applied from one side of the vehicle front to the vehicle body, or in a side pole crash, i.e., a crash in which impact load is applied locally to the vehicle side.

Specifically, as shown in FIG. 1 to FIG. 3, in this structure, the front seat cross member 29 and the rear seat cross member 31 have a branch structure, with portions thereof on both end sides in the vehicle width direction each forked into a front-side branch and a rear-side branch in the vehicle front-rear direction. Moreover, in this structure, the front seat cross member 29 and the rear seat cross member 31 are coupled together through beam members 45 which are coupling members extending in the front-rear direction.

The configuration of the front seat cross member 29, the rear seat cross member 31, and the beam members 45 will be described below in more detail.

As shown in FIG. 1 and FIG. 3, the front seat cross member 29 is provided so as to extend in the vehicle width direction. Portions of this front seat cross member 29 on both end sides in the vehicle width direction are formed by branch members 37 which are forked into two branches. Each branch member 37 is forked obliquely in a V-shape into a front-side branch and a rear-side branch in the vehicle front-rear direction, from a point on the outer side in the vehicle width direction of the backbone 5. The leading end of each divided front-side branch 37a extends obliquely forward in the vehicle width direction, passes on the lower side of a support member 39a on the floor which supports the front side of the front seat 7, for example, as shown in FIG. 2, supports a front part of the seat cushion 9a, and is coupled to a side part of the pair of side members 19. The leading end of each divided rear-side branch 37b extends obliquely rearward in the vehicle width direction, passes on the lower side of a support member 39b on the floor which supports the rear side of the front seat 7, for example, as shown in FIG. 2, supports a rear part of the seat cushion 9a, and is coupled to a side part of the pair of side members 19. Truss structures are established by the branch members 37 and the side members 19 in regions of the front seat cross member 29 further on the outer side in the vehicle width direction than the backbone 5.

The rear seat cross member 31 is provided so as to extend in the vehicle width direction. Both ends of the rear seat cross member 31 are coupled to the pair of side members 19. This rear seat cross member 31 is provided with inclined members 47 on both end sides in the vehicle width direction. These inclined members 47 extend from the rear seat cross member 31 obliquely forward toward the outer side in the vehicle width direction and are coupled to the side members 19. In this embodiment, one end of each inclined member 47 is coupled to a coupling part 46 which is a point on the rear seat cross member 31 on the outer side in the vehicle width direction of the backbone 5, and the other end extends obliquely forward toward a part where the leading end of the rear-side branch 37b of the branch member 37 and the side member 19 intersect with each other. Then, the other end is fixed at the leading end of the rear-side branch 37b, for example. That is, a branch structure forked into a front-side branch and a rear-side branch is formed on both end sides in the vehicle width direction of the rear seat cross member 31 by the inclined member 47 which constitutes the front-side branch and an end portion of the rear seat cross member 31, disposed further on the outer side in the vehicle width direction than the coupling part 46, which constitutes the rear-side branch. Truss structures are established by the side members 19, the rear seat cross member 31, and the inclined members 47 in regions of the rear seat cross member 31 further on the outer side in the vehicle width direction than the backbone 5. Alternatively, the inclined members 47 may be directly coupled to the side members 19 instead of being coupled to the rear-side branches 37b of the branch members 37.

As shown in FIG. 1 and FIG. 3, the beam members 45 extend in the vehicle front-rear direction along both sides in the vehicle width direction of the backbone 5, on the inner side in the vehicle width direction of the side members 19. With their ends fixed respectively on the front seat cross member 29 and the rear seat cross member 31, the beam members 45 couple together the front seat cross member 29 and the rear seat cross member 31. Each beam member 45 couples together, along the vehicle front-rear direction, a base end at which the front-side branch 37a and the rear-side branch 37b of the branch member 37 intersect with each other, i.e., a base portion at which the front seat cross member 29 is branched, and the coupling part 46, on the rear side of that base portion, to which the other end of the inclined member 47 of the rear seat cross member 31 is coupled, i.e., a base portion at which the rear seat cross member 31 is branched. Thus, truss structures are established by the rear-side branches 37b of the branch members 37, the inclined members 47, and the beam members 45.

That is, in this embodiment, the rigidity is enhanced as the truss structures each composed of three triangles are formed in regions of the lower frame 15 surrounded by the portions of the front seat cross member 29 and the rear seat cross member 31 on the outer side in the vehicle width direction of the backbone 5, the side members 19, and the beam members 45. The rigidity is also enhanced as a closed cross-section surrounded by the front seat cross member 29, the rear seat cross member 31, and the beam members 45 is formed directly below the backbone 5 which is excellent in rigidity and strength. Thus, the rigidity and strength are secured in the region from an area under the front seats 7 to an area under the rear seat 11, i.e., in the vehicle cabin 1 which is the residential space of occupants.

As shown in FIG. 2, a seatbelt anchor of a seatbelt 49 fitted in each front seat 7 is supported by the front seat cross member 29 and the rear seat cross member 31.

The rigidity of the floor 3 directly below the front seats 7 and the rear seat 11 is secured by this vehicle lower body frame structure. In a frontal offset crash or a side crash, this structure allows impact load applied to the side member 19 on a crash side to be dispersed to the front seat cross member 29 and the rear seat cross member 31 through the front-side branch 37a of the branch member 37, the inclined member 47, and the beam member 45. Thus, the impact load applied to the side member 19 on the crash side is efficiently transferred to the side member 19 on the non-crash side of the lower frame 15. FIG. 4 to FIG. 7 show, by way of diagrams, states of dispersion of impact load in various forms of crash.

Next, states of transfer of impact load in the vehicle lower body frame structure of this embodiment and the workings and effects of the structure will be described using FIG. 4 to FIG. 7.

Figure 4:
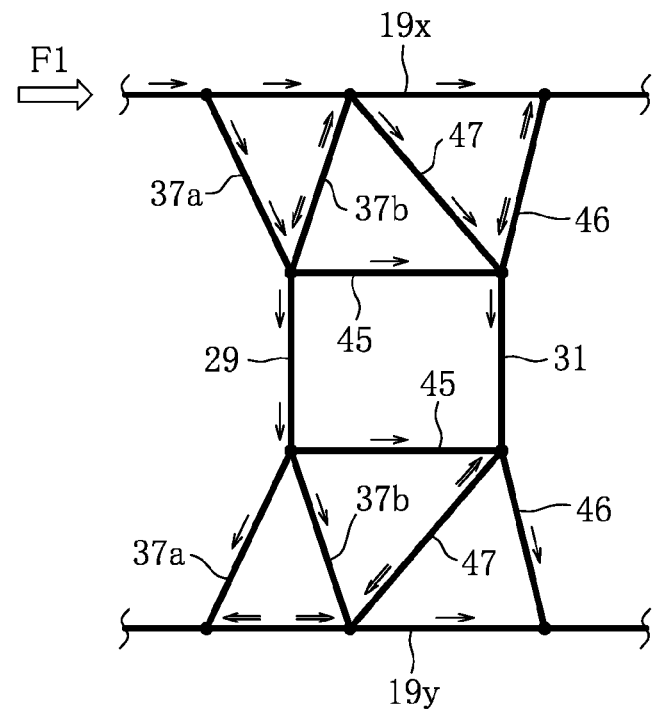
FIG. 4 is a diagram illustrating travel of impact load in a frontal offset crash.

As shown in FIG. 3 and FIG. 4, a case of a frontal offset crash which is likely to result in severe damage, for example, a case where impact load F1 is applied intensively to one side member 19x from one side of the vehicle front will be described. As indicated by the arrows in FIG. 4, the impact load F1 input from the front end of the side member 19x is dispersed from a part directly below the front seat 7 to the front-side branch 37a of the branch member 37 and the inclined member 47.

The part of the impact load F1 dispersed to the branch 37a disposed on the front side of the front seat 7 travels through the front seat cross member 29 while being further dispersed to the beam member 45. This part of the impact load F1 travels to a side member 19y on the opposite, non-crash side while being dispersed to the front-side branch 37a and the rear-side branch 37b of the branch member 37 and the beam member 45 located on the opposite side of the side member 19x on the crash side from which the impact load F1 is input.

Meanwhile, the part of the impact load F1 dispersed to the inclined member 47 travels to the rear seat cross member 31 along with the part of the impact load F1 travelling through the beam member 45. Then, the impact load F1 travelling through the rear seat cross member 31 travels to the side member 19y on the opposite, non-crash side while being dispersed to the inclined member 47 located on the opposite side of the input side of the impact load F1.

Thus, although the impact load F1 is applied intensively to the side member 19x, this impact load F1 is efficiently dispersed by the branch member 37 (front-side branch 3a) and the inclined member 47 on the input side (crash side) to the front seat cross member 29 and the rear seat cross member 31 before being transferred to the side member 19y on the opposite, non-crash side. Accordingly, the burden on the side member 19x on the crash side is relieved. Moreover, the impact load F1 dispersed by the branch member 37 (front-side branch 37a) and the inclined member 47 on the crash side is further dispersed to the branch member 37 (front-side branch 37a and rear-side branch 37b) and the inclined member 47 located on the opposite side (non-crash side) of the input side (crash side) before being transferred to the side member 19y on the non-crash side, so that the impact load does not concentrate on one part of the side member 19y on the opposite side (non-crash side).

High rigidity and strength are provided as the truss structures composed of the plurality of triangles are formed on both outer sides in the vehicle width direction of the backbone 5 by the side members 19, the branch members 37 (front-side branches 37a and rear-side branches 37b) of the front seat cross member 29, the inclined members 47, and the rear seat cross member 31. In particular, as indicated by the arrows in FIG. 4, the truss structure stably retains the same position, with two sides of the three sides of the triangle being compressed while the remaining one side being stretched under a tensile force acting toward both ends thereof. The structural stability of the truss structure provides the residential space of occupants around the front seats 7 and the rear seat 11 with the rigidity and strength to retain its shape. In addition, since the pair of beam members 45 are provided along the backbone 5, a frame-shaped region (closed cross-section) surrounded by the beam members 45 is formed between the front seat cross member 29 and the rear seat cross member 31 under the backbone 5. Thus, the frame-shaped region is structurally stabilized and is provided with high rigidity and strength. That is, the frame-shaped region is retained as is.

By thus securing the rigidity and dispersing load, it is possible to suppress deformation of the vehicle body in a frontal offset crash, i.e., deformation of the vehicle cabin 1 caused by an offset crash in which only the side member 19x moves toward the vehicle rear side. Accordingly, the vehicle cabin 1 where occupants are present is protected.

In a frontal crash (not shown) in which impact load is applied to the vehicle front side, too, deformation of the vehicle cabin 1 due to impact load is suppressed and the vehicle cabin 1 where occupants are present is protected as the rigidity is secured and the load is dispersed.

Figure 6:
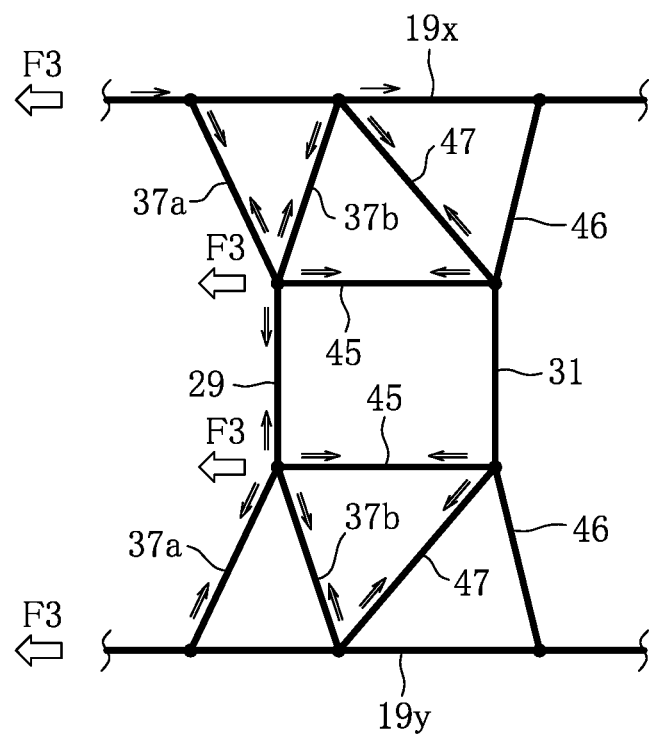
FIG. 6 is a diagram illustrating travel of impact load through seatbelt anchors in a frontal crash.
Figure 7:
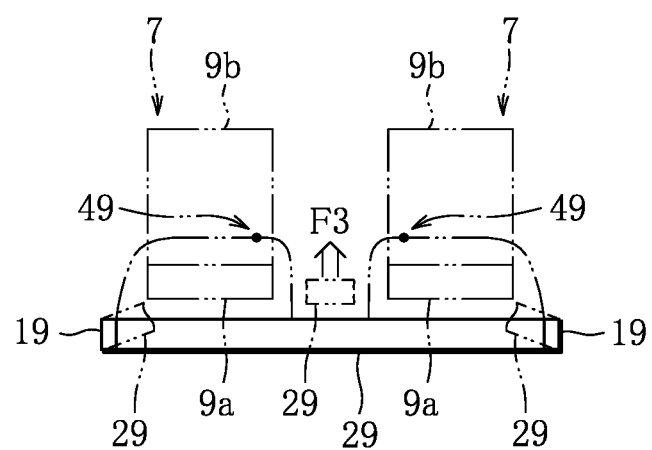
FIG. 7 is a schematic cross-sectional view illustrating behavior of a cross member caused by load applied to the seatbelt anchors.

As shown in FIG. 3, FIG. 6, and FIG. 7, for example, in a frontal crash (including a frontal offset crash), occupants sitting in the front seats 7 move forward by inertia, so that, as indicated by the arrow in FIG. 7, load F3 is input into the front seat cross member 29 through the seatbelt anchors (not shown) of the seatbelts 49.

If the load F3 is received by the front seat cross member 29 alone, an excessive bending stress is exerted on the front seat cross member 29 as indicated by the two-dot chain lines in FIG. 7. As a result, the front seat cross member 29 behaves so as to bend from the center in the vehicle width direction toward the inside of the vehicle cabin 1. However, in the lower frame 15 of this embodiment, the burden on the front seat cross member 29 is reduced and bending is suppressed by the branch members 37 and the beam members 45. That is, as shown in FIG. 6, the load F3 applied to the front seat cross member 29 travels to the side members 19 on both sides and the rear seat cross member 31 by being dispersed to the front-side branches 37a and the rear-side branches 37b of the branch members 37 and the beam members 45. Moreover, since the truss structures are formed in the front seat cross member 29 further on the outer sides in the width direction than the backbone 5, the front seat cross member 29 is provided with rigidity and strength while the burden thereon is relieved. The double arrow in FIG. 6 indicates a compression state and a tension state in which the truss structure is stable.

Thus, upward and forward deformation of the front seat cross member 29 is suppressed, and deformation of the vehicle cabin 1 where occupants are present is suppressed in the same manner as described above. That is, the vehicle cabin 1 is protected. Since the amount of forward movement and the amount of upward movement of the front seats 7 are reduced, the performance of protecting occupants sitting in the front seats 7 is improved. The same is true when the load F3 is received by the rear seat cross member 31.

Figure 5:
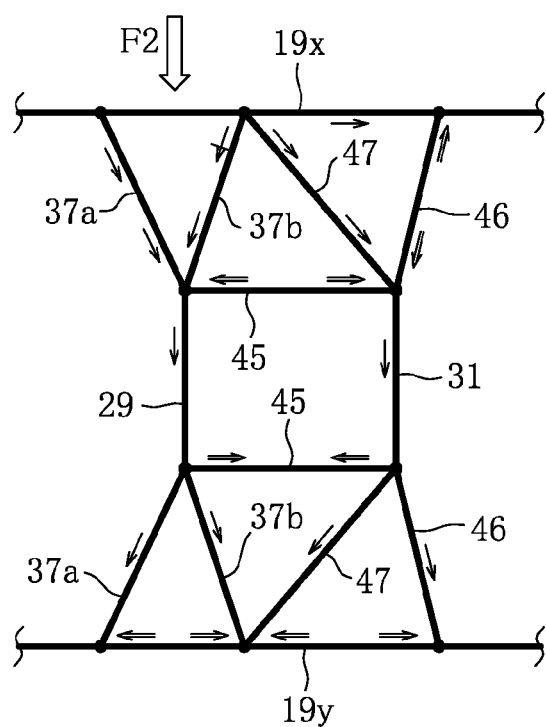
FIG. 5 is a diagram illustrating travel of impact load in a side crash.

Next, as shown in FIG. 3 and FIG. 5, a case where impact load F2 is applied to an intermediate part of one side member 19x (19) due to a side crash, for example, a side crash into a pole etc., will be described.

As indicated by the arrows in FIG. 5, the impact load F2 input into the side member 19x due to a side crash is dispersed to the branch member 37 of the front seat cross member 29 disposed directly below the front seat 7, the inclined member 47, and a portion of the rear seat cross member 31 on the outer side in the vehicle width direction. That is, the impact load F2 is received by the truss structure formed on the outer side in the vehicle width direction of the backbone 5, and is transferred to the front seat cross member 29 through the branch member 37, i.e., the front-side branch 37a and the rear-side branch 37b. The impact load F2 is further transferred to the rear seat cross member 31 through the inclined member 47 and the portion of the rear seat cross member 31 on the outer side in the vehicle width direction. Then, the impact load F2 transferred to the front seat cross member 29 travels to the side member 19y on the opposite, non-crash side while being dispersed to the front-side branch 37a and the rear-side branch 37b of the branch member 37 located on the non-crash side which is the opposite side of the input side of the impact load F2 (crash side).

Meanwhile, the part of the impact load F2 dispersed to the rear seat cross member 31 travels to the side member 19y on the opposite, non-crash side while being dispersed to the inclined member 47 located on the non-crash side which is the opposite side of the input side of the impact load F2 (crash side).

Thus, although the impact load F2 is applied intensively to one part of the side member 19x on the input side (crash side), the impact load F2 is efficiently dispersed to the front seat cross member 29 and the rear seat cross member 31 by the branch member 37 (front-side branch 37a) and the inclined member 47 on the input side (crash side). Then, the dispersed impact load F2 is transferred to the side member 19y on the opposite, non-crash side, so that the burden on the side member 19x is relieved.

Moreover, as has been described referring to the case of a frontal offset crash, stable high rigidity and strength are provided as the truss structures each composed of the plurality of triangles are formed on both outer sides in the vehicle width direction of the backbone 5 by the side members 19, the branch members 37 (front-side branches 37a and rear-side branches 37b) of the front seat cross member 29, the inclined members 47, the beam members 45, and the rear seat cross member 31. Accordingly, the residential space of occupants around the front seats 7 and the rear seat 11 is retained as is. Since the frame-shaped region surrounded by the beam members 45 is formed in an area where it faces the backbone 5, the frame-shaped region is also provided with stable high rigidity and strength and retained as is.

By thus securing the rigidity and dispersing load, it is possible to suppress deformation of the vehicle body in a side crash, especially a side pole crash, i.e., deformation of the vehicle cabin 1 caused by a side crash in which the impact load F2 is applied intensively to one part of the side member 19 and a side part of the vehicle body is significantly deformed toward the inner side of the vehicle body. Thus, the vehicle cabin 1 where occupants are present is protected.

As has been described above, in the vehicle lower body frame structure, the front seat cross member 29 and the rear seat cross member 31 of the lower frame 15 have a structure with the portions thereof on both end sides in the vehicle width direction each forked into two branches, and the front seat cross member 29 and the rear seat cross member 31 are coupled together in the vehicle front-rear direction by the beam members 45 which are coupling members. Thus, impact load can be efficiently dispersed to the front seat cross member 29 and the rear seat cross member 31 before being transferred to the side member 19y on the non-crash side. Moreover, since the truss structures are established between both end sides in the vehicle width direction of the front seat cross member 29 and the rear seat cross member 31 and the side members 19, the rigidity around the front seats 7 and the rear seat 11 can be enhanced.

It is therefore possible to sufficiently and effectively suppress deformation of the vehicle cabin 1 where occupants are present, not only in a frontal offset crash which is difficult to cope with but also in other forms of frontal crash and side crash (especially a side pole crash).

The beam members 45 are configured to couple together the base portion at which the front seat cross member 29 is branched (the base end at which the front-side branch 37a and the rear-side branch 37b intersect with each other) and the base portion at which the rear seat cross member 31 is branched (the coupling part 46 of the inclined member 47 and the rear seat cross member 31), so that these branching base portions reinforce each other. Thus, deformation of the front seat cross member 29 and the rear seat cross member 31 at the branching base point where impact load is likely to concentrate can be suppressed. Moreover, since the beam members 45 are provided along both sides in the vehicle width direction of the backbone 5, the strength of the beam members 45 is secured. Thus, it is possible to more firmly couple together the front seat cross member 29 and the rear seat cross member 31.

Furthermore, the rear-side branch 37*b* of the front seat cross member 29 and the inclined member 47 which is the front-side branch of the rear seat cross member 31 are coupled together so as to be able to support each other against an input of impact load. Thus, the strength against impact load can be further enhanced.

When the above-described structures are combined, the truss structures each combining three triangles are established by the branch members 37 of the front seat cross member, the inclined members 47, the rear seat cross member 31, the side members 19, and the beam members 45 in the regions below the front seats 7 and the rear seat 11, further on the outer side in the vehicle width direction than the backbone 5, so that the rigidity under the front seats 7 and the rear seat 11 can be further enhanced.

In the embodiment, to secure the rigidity and strength of the side members against a frontal crash, the side members are disposed so as to expand obliquely toward both sides in the vehicle width direction near the middle of the vehicle cabin. However, the side members may be disposed otherwise in a straight line in the vehicle front-rear direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body structure, comprising:
   a pair of side members disposed under a vehicle cabin where a front seat and a rear seat are disposed on both sides in a vehicle width direction and extending along a vehicle front-rear direction;
   a front seat cross member provided so as to extend along the vehicle width direction on a lower side of the front seat and coupling together the side members;
   a rear seat cross member provided so as to extend along the vehicle width direction on a lower side of the rear seat and coupling together the side members on a rear side of the front seat cross member; and
   coupling members provided so as to extend along the vehicle front-rear direction further on an inner side in the vehicle width direction than the side members and coupling together the front seat cross member and the rear seat cross member, wherein
   the front seat cross member and the rear seat cross member have a branch structure, with portions thereof on both end sides in the vehicle width direction each forked into a front-side branch and a rear-side branch in the vehicle front-rear direction.

2. The vehicle body structure according to claim 1, wherein the coupling members couple together a base portion at which the front seat cross member is branched and a base portion at which the rear seat cross member is branched.

3. The vehicle body structure according to claim 1, wherein
   a lower part of the vehicle cabin has a backbone provided so as to extend in the vehicle front-rear direction at a center in the vehicle width direction, and
   the front seat cross member and the rear seat cross member are branched on both outer sides in the vehicle width direction of the backbone, and the coupling members are provided so as to extend in the vehicle front-rear direction along both sides in the vehicle width direction of the backbone.

4. The vehicle body structure according to claim 2, wherein
   a lower part of the vehicle cabin has a backbone provided so as to extend in the vehicle front-rear direction at a center in the vehicle width direction, and
   the front seat cross member and the rear seat cross member are branched on both outer sides in the vehicle width direction of the backbone, and the coupling members are provided so as to extend in the vehicle front-rear direction along both sides in the vehicle width direction of the backbone.

5. The vehicle body structure according to claim 1, wherein an end of the rear-side branch of the front seat cross member and an end of the front-side branch of the rear seat cross member are coupled together.

6. The vehicle body structure according to claim 2, wherein an end of the rear-side branch of the front seat cross member and an end of the front-side branch of the rear seat cross member are coupled together.

7. The vehicle body structure according to claim 3, wherein an end of the rear-side branch of the front seat cross member and an end of the front-side branch of the rear seat cross member are coupled together.

8. The vehicle body structure according to claim 4, wherein an end of the rear-side branch of the front seat cross member and an end of the front-side branch of the rear seat cross member are coupled together.

* * * * *